US011318875B2

(12) United States Patent
Anderson et al.

(10) Patent No.: US 11,318,875 B2
(45) Date of Patent: May 3, 2022

(54) TRAILER SECURING AND RELEASING MECHANISM FOR A BOAT

(71) Applicants: Samuel Anderson, Charleston, SC (US); Dianne Jenkins, Mt. Pleasant, SC (US)

(72) Inventors: Samuel Anderson, Charleston, SC (US); Dianne Jenkins, Mt. Pleasant, SC (US)

( * ) Notice: Subject to any disclaimer, the term of this patent is extended or adjusted under 35 U.S.C. 154(b) by 0 days.

(21) Appl. No.: 15/064,672

(22) Filed: Mar. 9, 2016

(65) Prior Publication Data

US 2017/0259723 A1    Sep. 14, 2017

(51) Int. Cl.
*B60P 3/10* (2006.01)
*B63C 13/00* (2006.01)
*B63B 21/58* (2006.01)

(52) U.S. Cl.
CPC ............. *B60P 3/10* (2013.01); *B63B 21/58* (2013.01); *B63C 13/00* (2013.01)

(58) Field of Classification Search
CPC ......... B60P 3/10; B60P 3/1033; B60P 3/1066; B63C 13/00; B63B 21/58; F16B 45/06
USPC ........ 280/414.1, 508, 509; 414/536; 410/77; 292/335
See application file for complete search history.

(56) References Cited

U.S. PATENT DOCUMENTS 752,759 A * 2/1904 Crisler
2,107,312 A * 2/1938 Thompson ............... B60D 1/26
119/806

3,013,517 A * 12/1961 Isham ..................... B63B 21/54
114/221 R (Continued)

FOREIGN PATENT DOCUMENTS

WO    WO-2016164852 A1 * 10/2016 ............ B60P 3/1066

*Primary Examiner* — Anne M Boehler
(74) *Attorney, Agent, or Firm* — The Rapacke Law Group, P.A.

(57) ABSTRACT

A novel trailer securing and releasing mechanism for a boat is disclosed to facilitate the process when unloading and releasing a boat into the water as well as loading the boat back on the trailer via securing the boat's eye bolt, or ring. The invention device encompasses a spring- or hydraulically-activated mechanism normally attached to the trailer tongue. The boat loading mechanism operates by movement of a horizontal rod being forced in the direction toward the trailer resulting from contact by the boat ring. This contact and movement of the rod forward results in positioning the boat ring within an open claw-like device and, simultaneously, causes the open claw to slam shut wherein each claw arm lies with the boat ring and thereby affixing the boat to the trailer. As the rod arm is moved back within its housing by the forward motion of the boat the energy of said movement is captured and retained, either by a compression of a spring or of a fluid (gas or liquid) within a hydraulic mechanism. Subsequent disengagement of the boat ring from the claw-like device on the boat trailer results from release of the stored energy within the compressed spring (or fluid) to reverse the direction of movement of the horizontal rod that will result in the simultaneous opening of the claw mechanism and pushing of the rod head against the boat ring to release the boat from the trailer.

6 Claims, 6 Drawing Sheets

(56) References Cited

U.S. PATENT DOCUMENTS

| | | | | |
|---|---|---|---|---|
| 3,989,267 | A | * | 11/1976 | Robinson .............. B60P 3/1033 280/414.1 |
| 4,114,920 | A | * | 9/1978 | Boettcher ............. B60P 3/1033 280/414.1 |
| 4,545,596 | A | * | 10/1985 | Luke ...................... B60D 1/586 280/508 |
| 4,919,446 | A | * | 4/1990 | Higgins ................ B60P 3/1033 280/414.1 |
| 5,021,016 | A | * | 6/1991 | Currey ................... B63H 20/36 248/640 |
| 5,120,079 | A | * | 6/1992 | Boggs ................... B60P 3/1075 280/414.1 |
| 5,193,835 | A | * | 3/1993 | Sheets ................... B60P 3/1033 280/414.1 |
| 6,257,636 | B1 | * | 7/2001 | Hovis ....................... B66C 1/66 294/110.1 |
| 6,402,445 | B1 | * | 6/2002 | Smiley ................. B60P 3/1066 280/414.1 |
| 6,923,138 | B2 | * | 8/2005 | Holbrook ............. B60P 3/1066 114/344 |
| 8,393,650 | B2 | * | 3/2013 | Eliot, Jr. ............... B60P 3/1066 114/218 |
| 8,408,578 | B2 | * | 4/2013 | Staples .................... B60D 1/02 280/504 |
| 2002/0162201 | A1 | * | 11/2002 | Liu ....................... F16B 45/025 24/598.5 |
| 2008/0029683 | A1 | * | 2/2008 | Draghici .............. B60P 3/1066 248/640 |

\* cited by examiner

TRAILER SECURING AND RELEASING MECHANISM FOR A BOAT

BACKGROUND OF THE INVENTION

1. Field of the Invention

The present invention relates in general to securing mechanisms which are designed to securely connect one object to another object, such as a boat to a boat trailer. More specifically, the present invention is an automatic securing and releasing mechanism, which may be mounted on an appropriately equipped boat trailer, and latches or releases the securing eye of a boat.

2. Description of the Prior Art

Numerous attempts have been made in recent decades to solve the inconvenience and risk of injury associated with the present commonly used method of securing a boat to a trailer with a winch, strap and hook. This method usually entails the manual cranking of a winch to draw or release a strap that may be connected to a hook that may be hooked to the securing eye on the centerline of the bow of a boat. It typically requires an individual to access the point at which the boat and the trailer come in contact while the boat is in the water by wading in the water, leaning over the bow of the boat or climbing onto the tongue of the trailer. This current prevalent method is not only dangerous and inconvenient but is particularly difficult for one person to perform alone. It is also very difficult for an individual of limited strength to perform.

Several efforts have been made to deal with this problem. Some of these efforts include the following:

(1) A boat latch sold under the trademark SNAPPER, manufactured by EPCO Products, Inc., Fort Wayne, Ind. is an electronically controlled attachment device that entered the market within the last few years, a device that is cumbersome to install due its design and electrical hook up necessity, as well as its expense and vulnerability due to the electronics near a water environment;

(2) A boat latch sold under the trademark BOAT BUDDY, manufactured by ROECO, Inc. Fort Worth, Tex. is a simple and inexpensive device that attaches a boat to a trailer but does not offer an effective or convenient way to release the boat from the trailer. In effect, this device creates as much inconvenience in releasing a boat from a trailer as it creates convenience in connecting the two; and (3) Another product on the market is the boat latch sold under the trademark LAUNCH AND RETRIEVE BOAT LATCH manufactured by Release & Retrieve Boat Latch Pty Ltd, Adelaide, Australia. This product incorporates a latch that is offset from a boat's centerline and utilizes a unique eyehook on a boat's bow. Incumbent to the product's design is the necessity to change the typical eye hook found on most modern boats which can be a cumbersome exercise. Also disadvantageous to this product is that its design forces a boat's bow off center in order to latch putting lateral pressure on the boat trailer's guides causing potential damage.

Also, a wide variety of mechanisms have been designed using clasps, pins and hooks to automatically secure a boat to a trailer. Most are designed to eliminate the need for an individual to access the point of contact between boat and trailer while the boat is in the water when loading a boat onto a trailer. While one common element among most is their use of the securing eye that is standard equipment on most boats, other elements of prior designs vary widely.

One such earlier design for securing a boat to a trailer was a mechanism using a spring-loaded pin represented in U.S. Pat. No. 4,919,446, issued Apr. 24, 1990 to Higgins. This design, however, does not provide an automatic releasing mechanism and does not provide a secondary securing member to restrict movement of the boat's eyehook toward the tow vehicle.

Another earlier design for securing a boat to a trailer was a mechanism using a spring-loaded pin as taught in U.S. Pat. No. 3,989,267, issued Nov. 2, 1976 to Robinson. This design, however, does not provide an automatic securing or release mechanism, is difficult to attach to a typical modern boat trailer, does not employ a bow guide, does not provide a secondary securing member to restrict movement of the boat's eyehook toward the tow vehicle, and eliminates the potential use of the traditional winch apparatus.

Another such earlier design is represented in U.S. Pat. No. 5,120,079, issued Jun. 9, 1992 to Boggs. The novelty of this design was in the bow guide used to protect the boat and invention. And while a locking pin mechanism was used, no automatic release mechanism was employed and no secondary securing member to restrict movement of the boat's eyehook toward the tow vehicle is described.

Another earlier design which used a spring loaded pin is represented in U.S. Pat. No. 4,114,920 issued Sep. 19, 1978 to Boettcher. While a spring loaded pin assembly was used in combination with a bow guide, neither a release mechanism nor the ability to use the winch and strap apparatus was possible and the trailer mounting design is complicated and adds numerous parts. Also, no secondary securing member to restrict movement of the boat's eyehook toward the tow vehicle is described.

Another earlier design which employs a spring loaded pin and a bow guide is U.S. Pat. No. 5,193,835 issued Mar. 16, 1993 to Sheets. This design, however, does not entail a simple to install, one piece designed apparatus that has an automatic release mechanism accompanying the securing mechanism nor a secondary securing member to restrict movement of the boat's eyehook toward the tow vehicle is described.

A design which does not employ a pin mechanism but does have an automatic release mechanism is U.S. Pat. No. 6,923,138 issued Aug. 2, 2005 to Holbrook. The mechanism utilizes a motor driven rotating head on a shaft that protrudes from the bow of a boat and is captured and released by two steel plates. The mechanism is relatively complicated with numerous moving parts in various conditions. It also requires modification to the standard bow securing eye found on most boats and does not allow for the traditional winch, strap and hook method to be used as a back-up.

A more recent design actually accomplishes the goals of the instant invention, though in a different, more complicated, manner. U.S. Pat. No. 8,393,650 issued Mar. 12, 2013 to Eliot. The patent claims a securing mechanism comprising; a housing having a recess for receiving a securing eye of the boat; a securing member movably disposed along a path within said housing and perpendicular to said recess and having a first end, a second end, a first slot proximate said first end and a second slot proximate said second end; a trigger having a mid portion defining a boundary of the recess and having a distal insert for selectively engaging said first slot defining an open condition or said second slot defining a closed condition; an energy storage device operatively attached to the securing member to selectively bias the securing member to either: a) said open condition where a portion of the securing member is within said recess while said trigger is engaged with said second slot; or, b) said closed condition where no portion of the securing member extends across said recess while said trigger is engaged with said first slot; and, a secondary energy storage device disposed between the housing and mid portion of said trigger to bias the distal insert of said trigger into contact with said first slot or said second slot and where the bias of said second energy storage device can be overcome to disengage the distal insert of said trigger from either said first slot or said second slot.

The instant invention is designed (and operates) quite differently from the aforesaid devices.

BRIEF DESCRIPTION OF THE INVENTION

The instant invention, disclosed herein and referred to as the "Slam Claw," employs no standard winching device or operation, and is guaranteed to save time when unloading and releasing the boat into the water as well as loading the boat back on the trailer and securing the boat's eye bolt, or ring to the trailer. The generally horizontal securing and releasing mechanism is positioned on the trailer tongue by a generally vertical support member firmly attached at its bottom directly on the trailer tongue. Attached at a height aligned with the boat prow's ring (or eye bolt), the external housing for the mechanism extends from its attachment to the support member to its location of a "claw like" device for attachment to the boat's eye bolt. The housing contains a rod that extends outward within the space of the claw in its open position when the boat is not attached to the trailer. A significant benefit of the securing and releasing mechanism is that it operates manually, so there are no electrical parts to be affected by contact with water.

When the boat returns to the trailer and is guided to align the boat ring into the open claw, the force of the boat slamming into the end of the rod and moving it back out of the space within the open claw to cause the other end of the rod to move back to actuate levers to cause the claw to close and clamp together within the boat ring, securing the boat to the trailer. Also, as the rod moves back toward the support member, it compresses a spring behind the claw mechanism that stores energy needed to open the claw for later releasing the boat. Such release is initiated by manually moving a switch to remove the pressure on the spring and use its stored energy to move the rod forward again, simultaneously causing the claw to reopen and, thereby, release the boat ring.

BRIEF DESCRIPTION OF THE INVENTION DRAWINGS

DETAILED DESCRIPTION OF THE INVENTION

The prior art discussed above generally describes the current method of use of a belted winch mechanism that involves manually attaching a belt to the boat's prow ring and winching the belt to draw the boat onto the trailer and retaining it against the trailer's winch mechanism. Most simply described, the presently disclosed invention effectively replaces the prior art methods of launching from and attaching a boat to a trailer by a method of driving the boat onto the semi-submerged trailer to contact the head of a horizontal rod located within the open claw mechanism (of the herein disclosed invention attached to the trailer tongue) with the boat's prow ring, thus moving the rod in the direction the boat is moving and causing the open claw-like mechanism to slam shut to engage the boat ring and thereby affixing the boat to the trailer. The term "claw-like" is intended to mean specifically that two opposed claw-shaped arms operate like the claws of a crab in that they present an open position to grab an object and quickly close when the object comes within their range of movement. In the case of the instant invention the claw-shaped arms actually overlap at their distal ends to assure said capture. Though the closing action of the Slam Claw happens very quickly, it is appreciated that as the rod arm is being moved back by the forward motion of the boat, a spring within the rod becomes compressed and at the same time the movement of the rod causes the movement of a rod arm attached at a 90° angle to the rod which causes the engagement of a switch located on a side panel of the invention device. A subsequent disengagement of this switch will cause release of the compressed spring to reverse the direction of movement of the rod arm that will result in the simultaneous opening of the claw mechanism and pushing of the rod arm head against the boat ring to release the boat from the trailer.

Figure 1:
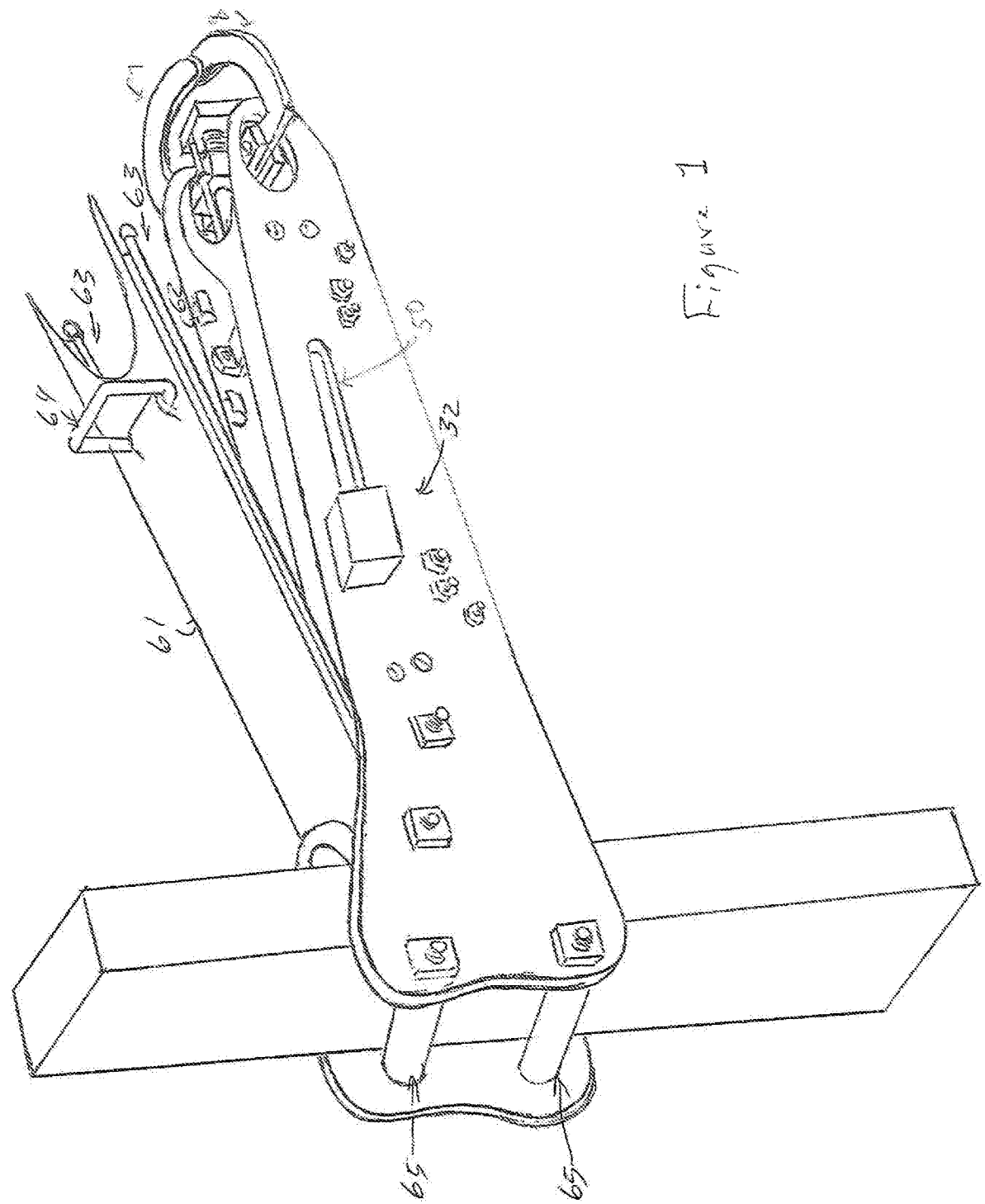
FIG. 1 is a perspective view of the body of the invention "Trailer Securing and Releasing Mechanism for a Boat" secured to a vertical support provided on a tongue portion of a boat trailer. The figure shows the top portion in a raised position to show the manner of attachment to said body and its manner of provision of access to the internal portion of the body.

With reference to FIG. 1, the instant invention "Trailer Securing and Releasing Mechanism for a Boat" operates via a generally horizontal securing and releasing mechanism positioned on the trailer tongue by attachment to a generally vertical support member. The opposing side panels of the invention device are secured by drawing them against the vertical support member using screws, running through attachment rods 65 and secured by nuts as shown. The top panel 61 of the invention is shown in a raised position to show its manner of attachment using respective rods 63 running the length of the panel on each opposing side. When closed, the rods are secured by tension created by lying within rod receivers 62. Also, shown on the top panel is handle 64 used to lift the panel to overcome its tension attachment by the rod receivers 62. Also, as the Slam Claw of the device is shown in its closed position, it is noted that switch 32 is shown at the rear (or back) of the slot 50 provided for internal backward movement of the rod arm having caused closure of the right claw 7 and left claw 8 (for capture of the boat prow ring).

While the invention is not depicted in the drawings with a bottom panel, as the location of the invention on the supporting vertical member is expected to keep the device well above water level, such a bottom panel is envisioned if its operating location on the trailer should result in excessive water exposure. Its attachment may be by removable screws or in a manner similar to the top panel, either of which would allow access to the internal mechanics of the invention device.

Figure 2:
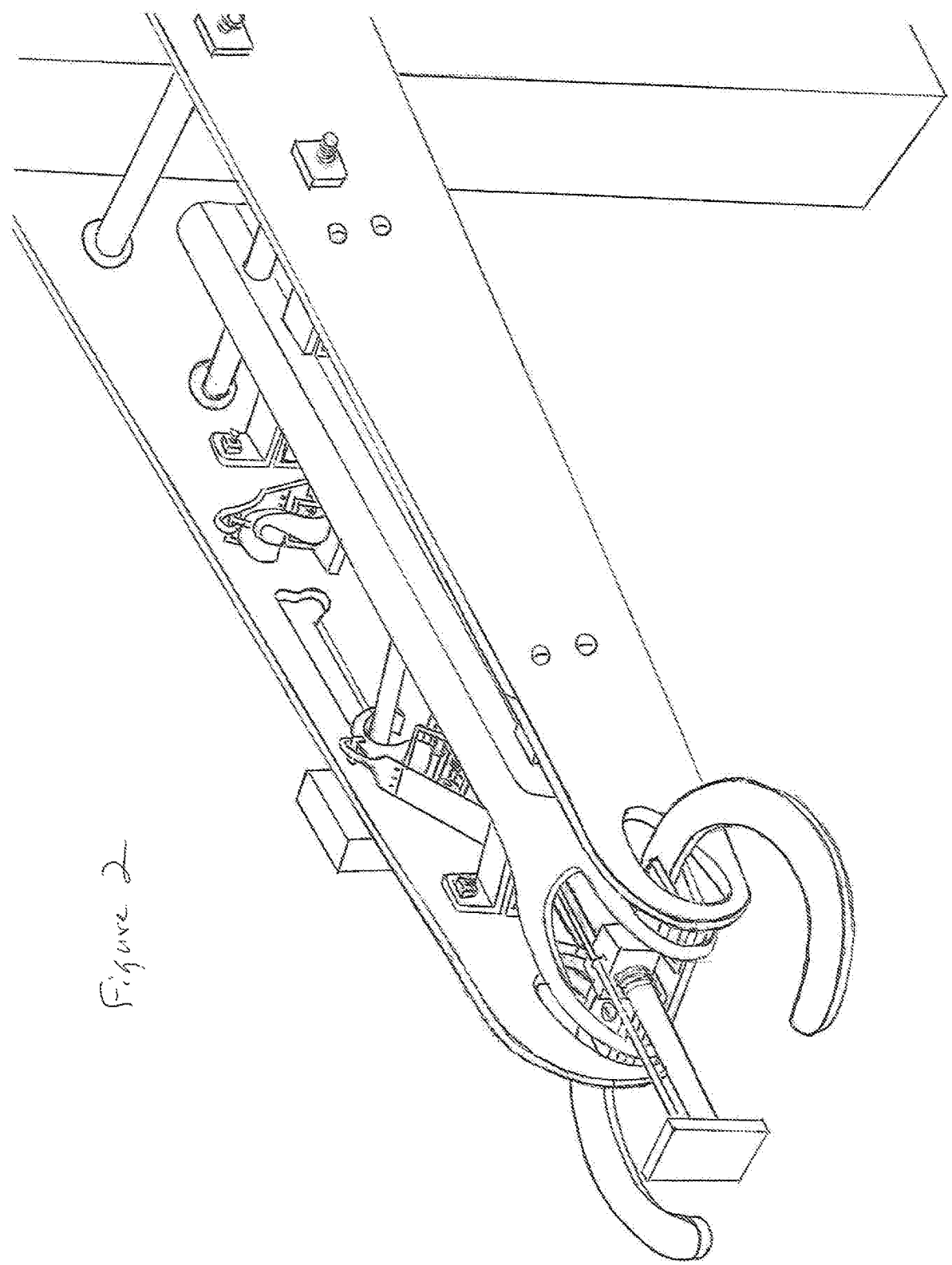
FIG. 2 is a perspective view of an embodiment of the invention "Trailer Securing and Releasing Mechanism for a Boat" with the top portion removed, permitting a different perspective view of the internal mechanics of the invention.

With reference to FIG. 2, shown is a perspective of the invention "Trailer Securing and Releasing Mechanism for a Boat" with the top panel removed entirely to further expose the internal mechanism of the invention. It will be appreciated that the Slam Claw portion of the invention device is now in the open position, ready to receive a ring attached to a boat's prow. This is also apparent from the position of the rod and rod head, which now has been pushed forward (from their position in FIG. 1), which force will have pushed the released boat away from the trailer. The inter-related operations of the various components of the internal mechanism will be appreciated in the discussion of FIG. 6, below.

Figure 3:
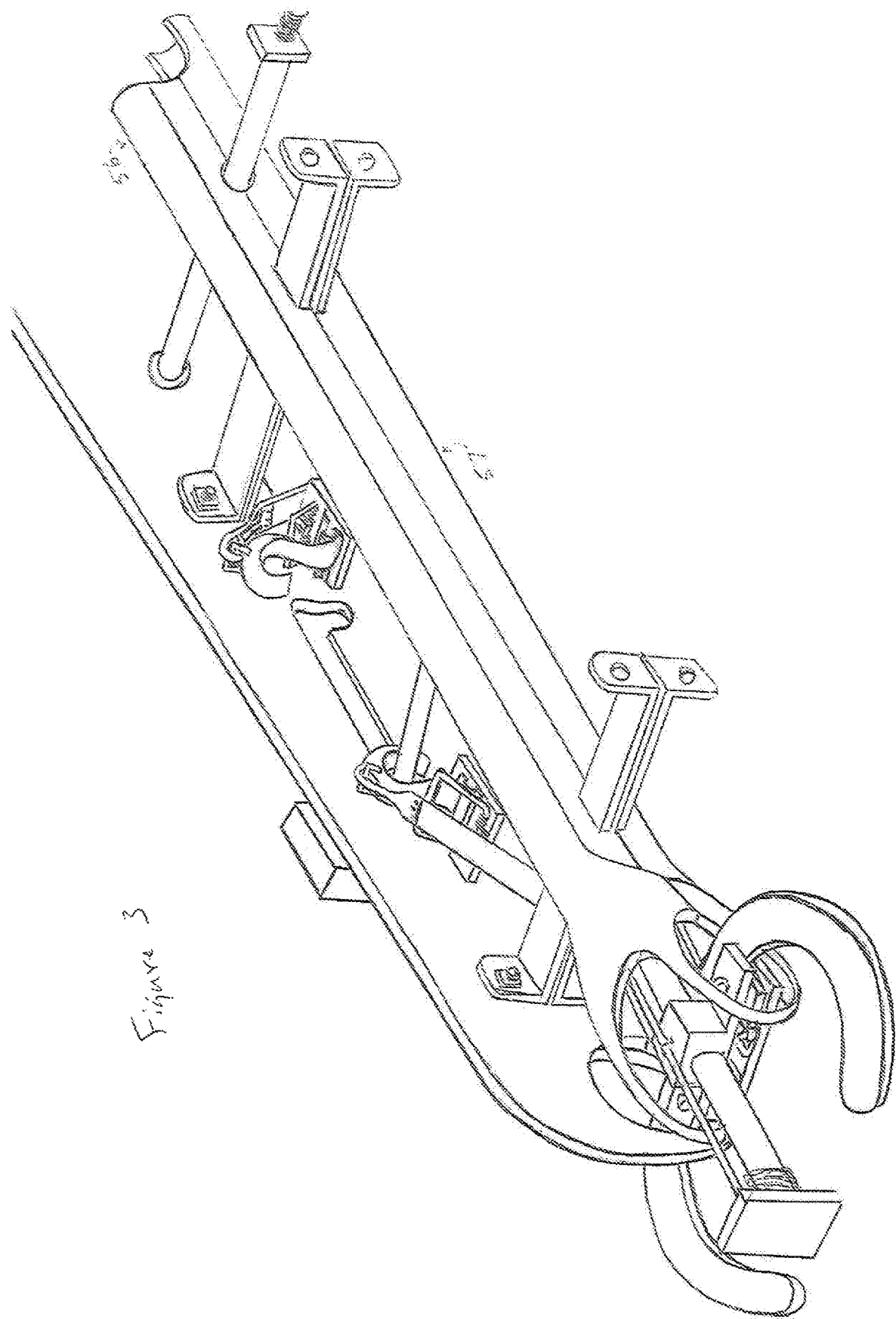
FIG. 3 shows another view of the invention "Trailer Securing and Releasing Mechanism for a Boat" with both the top and one side removed therefrom, permitting still another perspective view of the internal mechanics of the invention.

With reference to FIG. 3, shown is a perspective similar to that of FIG. 2 except near side panel has been removed to show more clearly the internal mechanism of the invention device. In particular, it exposes the top (56) and bottom (57) of the rod support system. The separate support system pieces come together to encompass and provide a channel of movement for the greater length of the rod that actuates the closing and opening of the Slam Claw element of the invention device.

Figure 4:
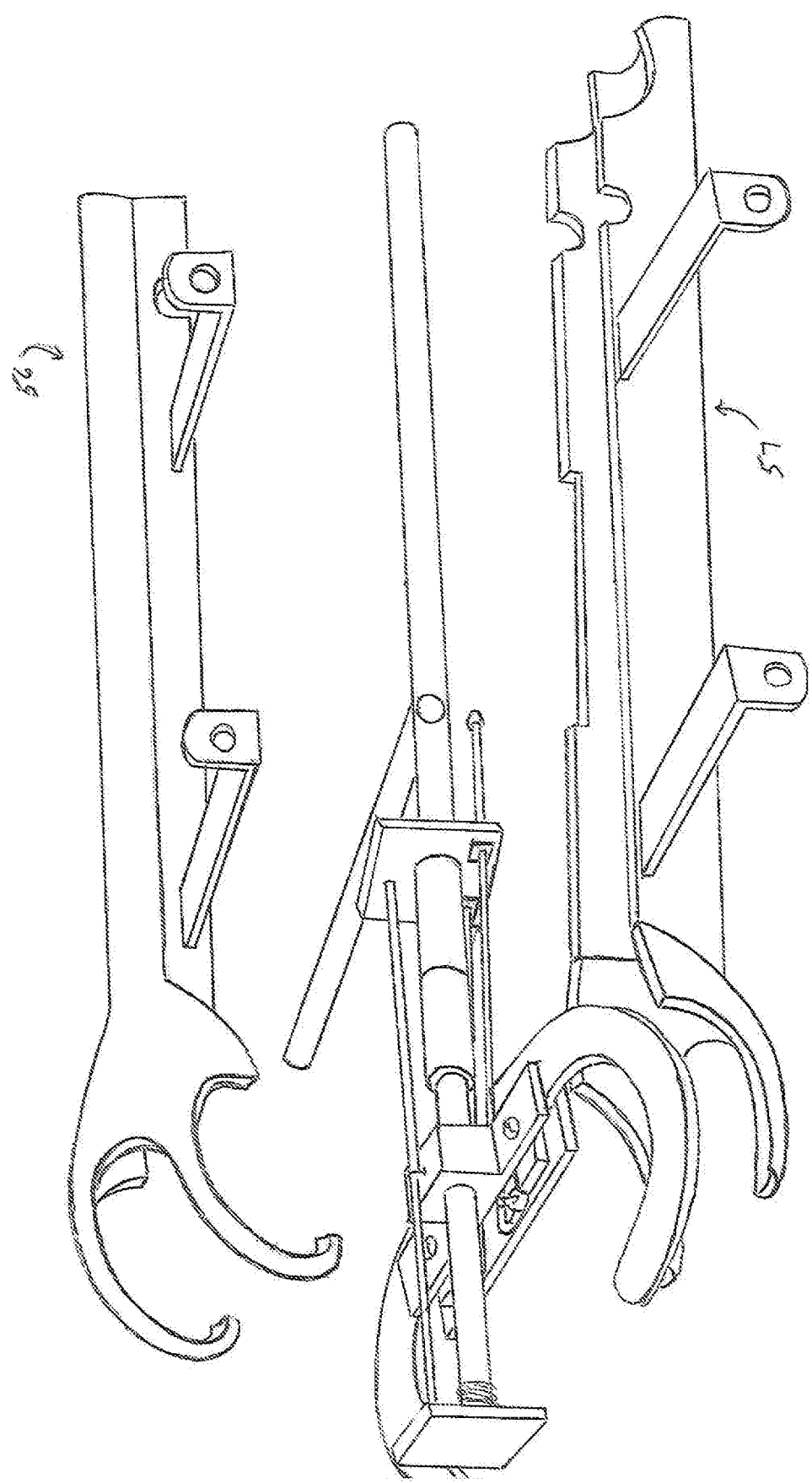
FIG. 4 is an exploded view of the internal mechanics of the invention "Trailer Securing and Releasing Mechanism for a Boat" without its top or either side portions.

FIG. 4 is an exploded view of the construction of the channel formation within which the actuator rod travels back (to cause closure of the claw elements to capture a boat's prow ring) and then forward (to cause the claw elements to open as the rod head pushes against the boat's prow ring to release the boat), which represent the true "heart" of the invention operation. The additional, related elements of the internal mechanism that operate to create and control both movements are discussed related to FIG. 6, below.

Figure 5:
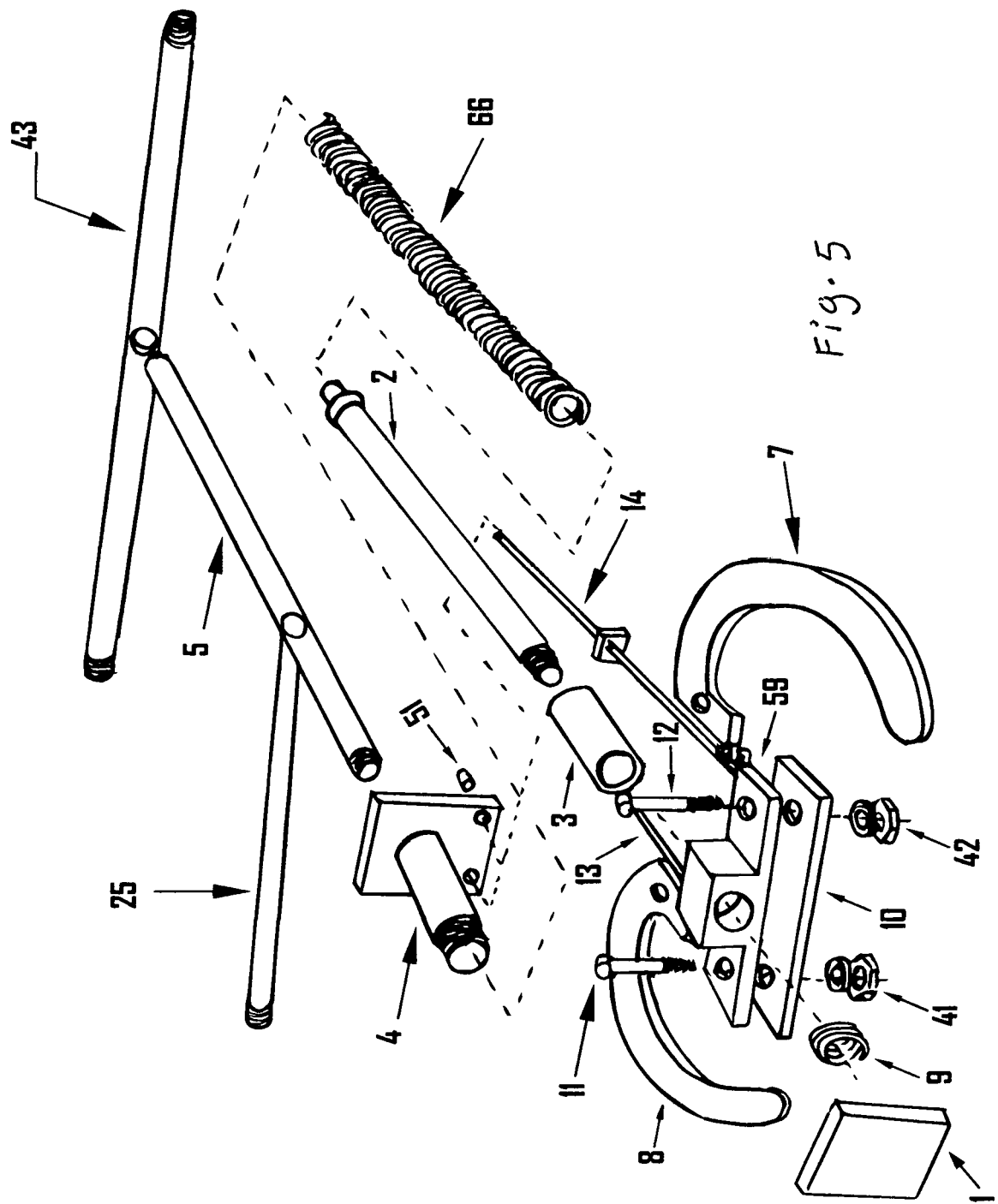
FIG. 5 shows yet a further exploded view of that portion of the internal mechanics of the invention "Trailer Securing and Releasing Mechanism for a Boat" that represents the "heart" of the invention, as will be explained in the detailed description of the invention.

FIG. 5 is a further exploded view of just the central portion of FIG. 4 and shows the inter-connectedness of the elements comprising the operation of the rod movement with the opening and closing of the respective claw-like elements that provide the results of latching and unlatching of the Slam Caw to effect the capture and releasing of the boat prow ring. The dash lines show how, and in what order, the various rod elements, including the internally loaded spring go together. This FIG. 5 helps to understand the working of the core of the invention device that operates the closing and opening of the claw-like elements and the simultaneous movement of the rod. For example, the exploded view of the claw assembly permits a view of the pivot point of the right claw via circular eye 59 attached to the right claw allowing said eye to admit the up-turned portion of the right claw small rod 14. (The view of the up-turned portion of the left claw small rod 13 is obscured, but said up-turned left claw small rod 13 terminates at the left claw 8 and attaches to said claw 8 in eye in a mirror version as does unobscured claw 7 and eye 59.) Though the view is obscured, the same arrangement exists for the left claw in relation to its connection to the left claw small rod 13. Note also the alignment (shown by the dash lines) of rod plate 52 with respect to the left (13) and right (14) claw small rods, which extend through holes allowing movement of rod plate 52 along the respective claw small rods. Further, such movement is limited in distance by claw small rod end screw caps 51 larger than holes (to limit movement of the rod back in closing the claw-like elements) and right and left small rod plates 18 affixed to the respective left (13) and right (14) claw small rods 13 and 14 (to effect movement of the rod forward in closing the claw-like elements 7 and 8). Note the visible right small rod plate 18 in FIG. 6.

Figure 6:
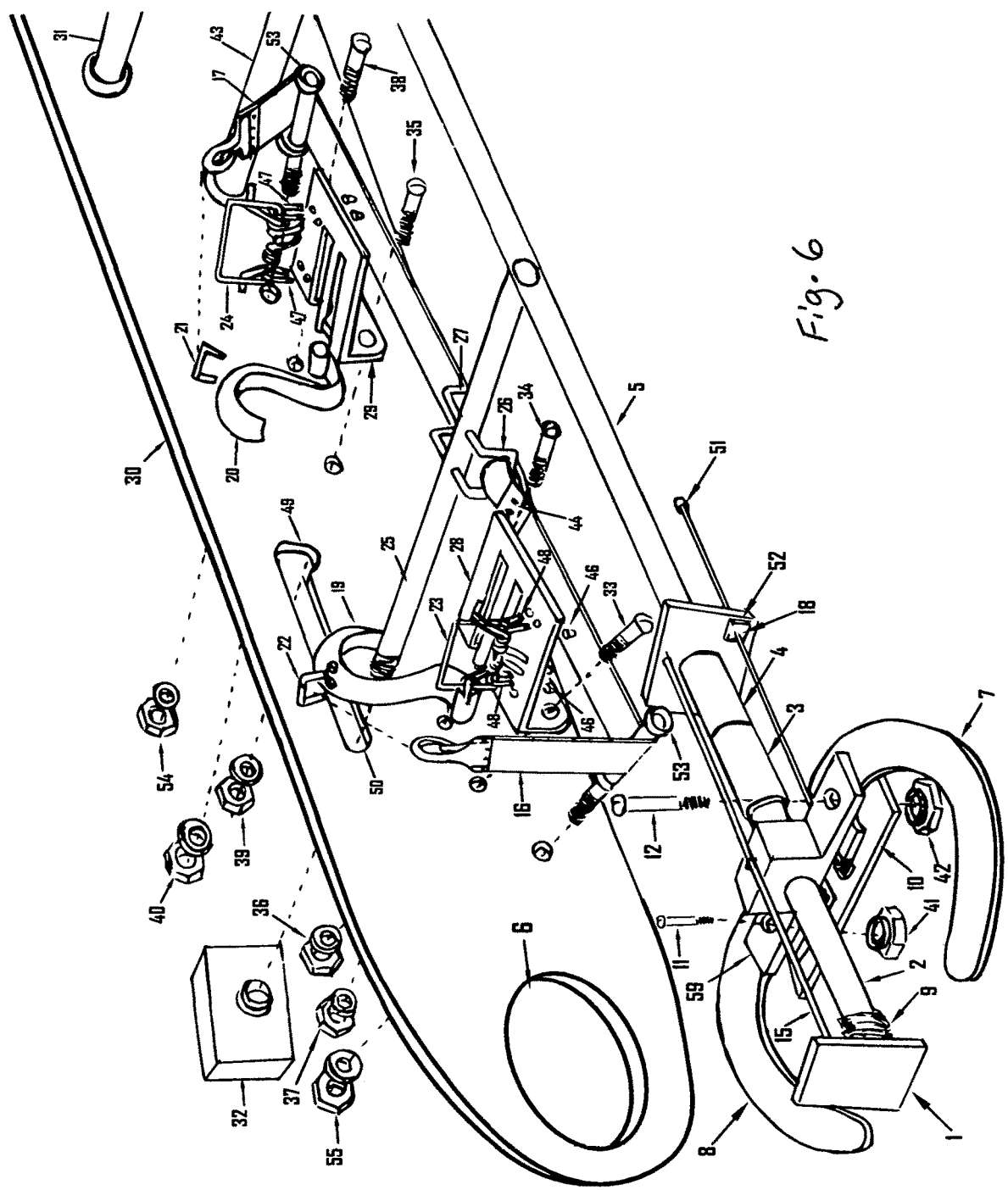
FIG. 6 is an exploded view of the internal mechanics of the invention "Trailer Securing and Releasing Mechanism for a Boat" with the top and one side panel removed to show the inter-related workings of the internal mechanism used to close the Slam Claw to latch onto a boat's prow ring, as well as to open the Slam Claw to release the boat from the trailer.

FIG. 6 basically shows an exploded view of FIG. 3, absent the top (56) and bottom (57) of the rod support system to more clearly show the inter-connectedness of the elements of the internal mechanics of the invention device. With reference to FIG. 6, the closing of right (7) and left (8) claw-like elements can be imagined to be set in motion by the boat ring slamming into rod head 1. A small section of spring (9) may be located between rod head 1 and rod front end 2 to cushion the initial impact of the boat prow ring. Such cushioning effect should reduce the stress placed along the length of the rod-and-spring arrangement and minimize the frequency of respective parts replacements. Movement of rod head 1 causes movement of the entire rod-and-spring arrangement, including rod front end 2, front end hollow chamber 3, back end hollow chamber 4, rod plate 52, and back end of rod 5. When the rod arm 25 reaches approximately half way to the closed position, rod plate 52 will hit against screw caps 51, at which point the backward movement of rod plate 52 will also begin a backward movement of both left (13) and right (14) claw small rods, which will initiate movement of claws 7 and 8 toward a closed position due to theft attachments to said rods 13 and 14 via eyes. When this happens, rod arm 25 also moves toward the back of the invention device. Such movement of rod arm 25 causes said rod arm 25 to move within slot 50 within left side panel 30 toward a lowered notch at the back of said slot 50 referred to as a "safety groove" 49. When rod arm 25 drops into safety groove 49, it is held in that position and resists pressure from the now compressed spring. Rod arm 25 extends through slot 50 and its end is threaded to receive switch 32 residing external to left side panel 30. At the same time rod arm 25 is moving back within slot 50, rod arm 25 moves the belts and hooks attached to the rod arm 25 by left (26) and right (7) belt support bars. This backward movement causes front belt and hook 16 to pull back on left lever 19, lifting it (by said belt and hook's attachment on front lever head bar 22) and lifting left lever 19 off and away from rod arm 25. Simultaneously, such movement of the back end of the rod 5, causes rear belt and hook 17 to allow forward movement of rear lever 20 belt and hook 17 attachment to said rear lever 20 at rear lever head bar 21. Such forward movement of rear lever 20 causes it to be lowered onto rod arm 35 as it moves rearward along slot 50 and drops into safety groove 49. Both safety groove 49 and hook 17 act to secure the Slam Claw (claw-like elements 7 and 8) in its closed position.

When ready to release the boat prow ring from the Slam Claw, only upward pressure under switch 32 is required to lift rod arm 25 out of safety notch 49, which removes any restriction to the release of the energy stored in the form of compressed energy storage spring 66. The compressed energy storage spring 66 residing in front end hollow chamber 3 and back end hollow chamber 4. The permitted expansion of said spring 66 moves said plate along its path determined by left (13) and right (14) claw small rods passing through holes in rod plate 52 for left claw small rod 68 and for right claw small rod 67 (more clearly shown in FIG. 5), respectively, and small top rod support 15. Basically, everything that happened when closing the Slam Claw happens again, only in reverse. Lifting switch 32 will first slightly raise lever 20 out of its position of restraining forward movement of rod arm 25. Then it will result in movement forward by rod arm 25, which will force movement forward by the belts attached thereto by left (26) and right (27) belt support bars, resulting in complete release of lever 20 and rapid movement forward of back end of rod 5. Movement forward of rod 5 will cause movement forward of rod plate 52 to the point of said plate striking small rod plates 18, which will, from that point forward, force forward movement of left (13) and right (14) claw small rods, which forward movement will initiate movement of claws 7 and 8 toward an open position due to their attachments to said rods 13 and 14 via eyes. Such open position of said claws 7 and 8 clears the path of rod head 1 as it is pushed forward by the forward movement of back end of rod 5, back end of hollow chamber 4, front end of hollow chamber 3, and rod front end 2. Opening of the claws 7 and 8 releases the previously captured boat prow ring and the forward movement of rod head 1 pushes the boat away from the trailer.

In summary, the invention resides in a securing mechanism for affixing and releasing a boat to a trailer comprising: a claw-like device defined as having hinged arms permitting the claw-like device to alternate between a closed condition for receiving a securing ring located along the prow of the boat and in an open condition for releasing said securing ring to launch the boat; a rod movably disposed along a path within a housing attached to the trailer for receiving the rod having a first end that remains external to the housing, a second end that moves along a horizontal path within the housing, and a mid-portion of the rod lying between the first and second ends; a rod arm, defined by being attached at a 90° angle along the mid-portion of the rod and lying within the same plane as the rod and having a second end of the rod arm to engage a retention means permitting storing energy created by the rod's movement caused by being contacted by the boat; an energy storage means operatively attached to the rod to selectively bias the hinged claw-like device to either an open condition or a closed condition; and a switch mechanism accessible external to the housing for manually moving the switch to disengage the retention means to release the stored energy causing the rod to move along its path within the housing causing the claw-like device to move to the open condition and the head of the rod to contact the boat ring to move the boat away from the trailer. Various energy storage mechanisms are envisioned as including various alternative energy sources, such as the use of one or more springs, an elastomeric member, fluid pressures (gas or liquid), a permanent magnet, an electromagnet, a solenoid, and gravity.

While the present general inventive concept has been illustrated by description of some embodiments, and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept. In particular, the invention construction materials are not limiting to the invention. Inasmuch as durability in relation to operating environments and conditions are always desirable, galvanized steel is seen as an obvious choice for the side and top panels of the invention that protect its internal mechanisms from exposure to harsh conditions. There are also, many hard plastic materials that would also achieve similar benefits with additional benefits such as lighter weight. There may even be newly developed materials not currently know that could be envisioned to suffice in the invention construction. Regardless, however, the invention does not lie in construction material choice. As to the belts use in the internal mechanism of the disclosed invention, durable, pliable materials that retain shape and texture are envisioned to be desirable, similar to vulcanized rubbers and combination of rubber and fiber construction used to drive pulleys in automobile engines. Again, however, the invention lies in the operation of the internal mechanics of the device and not in its construction materials.

It is also noted that numerous variations, modifications, and additional embodiments are possible, and, accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Accordingly, while the present general inventive concept has been illustrated by description of particular embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

What is claimed is:

1. A securing mechanism for affixing and releasing a boat having a prow to a trailer comprising:
    (1) claw defined as having hinged arms permitting the claw to alternate between a closed condition to secure a ring located along the prow of the boat and an open condition to release the securing ring to launch the boat;
    (2) a rod movably disposed along a horizontal path within opposing side panels of the securing mechanism attached to the trailer for receiving the rod having a first end, on which is located a rod head that remains external to the opposing side panels, a second end that moves along the horizontal path between the side panels, and a mid-portion of the rod lying between the first and second ends;
    (3) a rod arm, defined by having a first end attached at a 90° angle along the mid-portion of the rod and lying within the same plane as the rod and having a second end of the rod arm to engage a retention means for storing energy created by the rod's movement caused by being contacted by the boat prow ring;
    (4) an energy storage means operatively attached to the rod to selectively bias the claw to either the open condition or the closed condition;
    (5) and, a switch mechanism accessible external to one of the opposing side panels for manually moving the switch mechanism to disengage the retention means to release the stored energy causing the rod to move along its path within the securing mechanism causing the claw to move to the open condition and the head of the rod to contact the boat ring to move the boat away from the trailer.

2. The securing mechanism of claim 1 further configured so that the rod movement is selectively bias-able in a first direction wherein the switch mechanism is engaged to prevent movement of the rod and wherein the switch mechanism can be disengaged to release the stored energy, causing movement of the rod in a second direction.

3. The securing mechanism of claim 2, wherein the switch mechanism is configured to receive pressure selectively causing the rod to engage in response to the rod movement in the first direction from the open condition to the closed condition.

4. The securing mechanism of claim 3, wherein said first direction is such that the claw engages the securing ring of the boat.

5. The securing mechanism of claim 1, wherein the energy storage device comprises a member of the group consisting of a spring, an elastomeric member, gas pressure, liquid pressure, a permanent magnet, an electromagnet, a solenoid, and gravity.

6. The securing mechanism of claim 1, wherein a force applied to the energy storage means is selected from the group consisting of compression and tension release forces and is applied to said energy storage means by a biasing mechanism.

* * * * *